April 17, 1928. 1,666,787
A. J. MICHELIN
PNEUMATIC PRESSURE GAUGE
Filed March 3, 1927
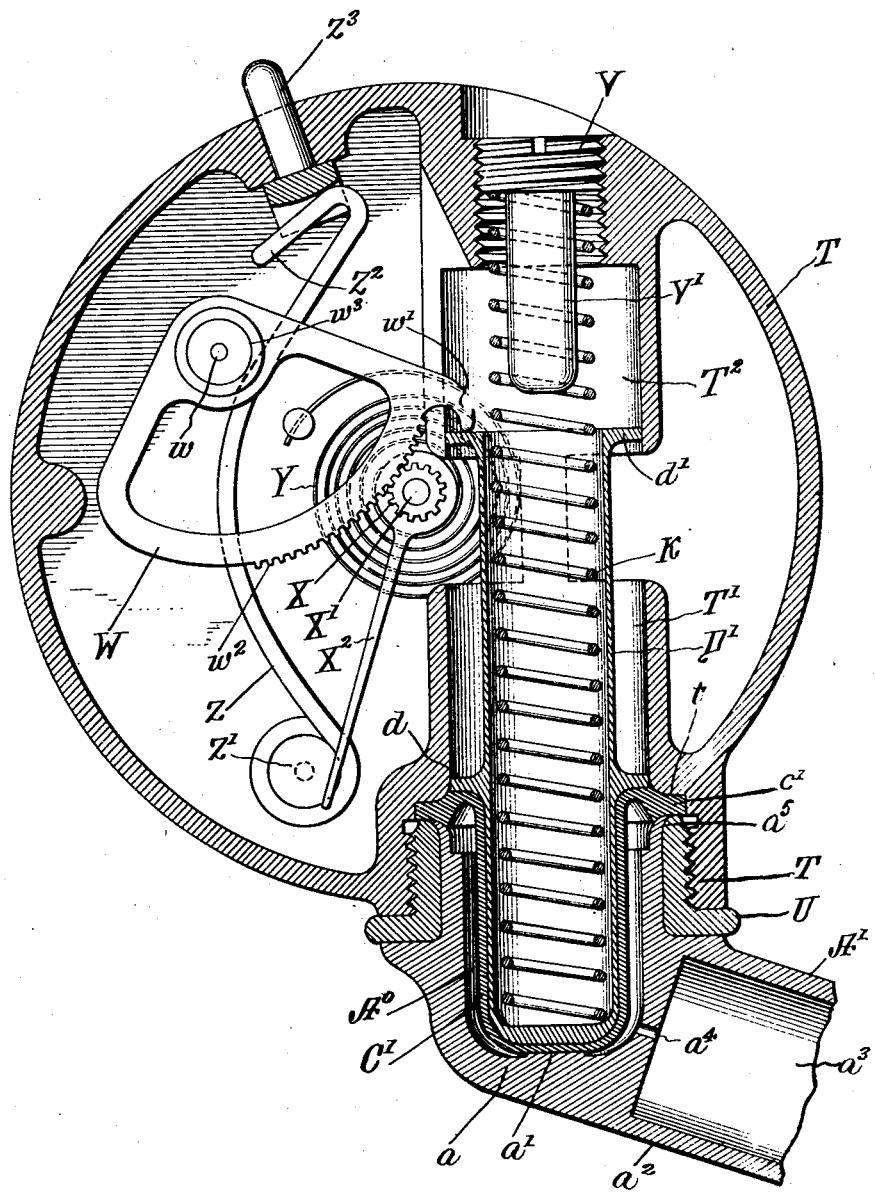
Inventor
André J. Michelin
by Wilkinson & Giusta
Attorneys.

Patented Apr. 17, 1928.

1,666,787

UNITED STATES PATENT OFFICE.

ANDRÉ JULES MICHELIN, OF PARIS, FRANCE, ASSIGNOR TO MICHELIN ET CIE., OF CLERMONT-FERRAND, FRANCE, A CORPORATION OF FRANCE.

PNEUMATIC-PRESSURE GAUGE.

Application filed March 3, 1927, Serial No. 172,365, and in Belgium March 5, 1926.

My present invention relates to improvements in pressure gauges, and it is intended to provide a simple and efficient pressure gauge, which is not apt to get out of order, and which rarely needs adjustment, and which can be quickly and conveniently used when desired, and which may also be read with facility.

While the invention is especially adaptable for use in registering the pressure of pneumatic tires, it may also be used to register pneumatic or gas pressures of other arrangements or devices than tires, and I do not mean to limit the invention to the use on pneumatic tires only.

My invention will be understood more clearly after reference to the accompanying drawing, in which The single figure represents a section through the pressure chamber and through the housing containing the operative parts, parts being broken away.

In the embodiment of the invention shown, the casing $A'$ is provided with a pressure chamber $A^o$, which is connected by the air duct $a^4$ to the air chamber $a^3$, which in turn is connected to the tire or other arrangement (not shown) having the air or gas whose pressure is to be measured. As such arrangement is not a part of my present invention, I have not attempted to show such arrangement in this figure, but it will be obvious that the pressure of air or gas in apparatus of various kinds may be tested by connecting said air or gas with the air chamber.

This casing $A'$ carries the ring U, which is screw threaded exteriorly to engage the interior screw threads of the housing T, which is preferably closed, and contains the various parts that will be hereinafter described. This ring U may be kept in place on the casing $A'$ in any convenient way, as by swaging out the faces $a^5$ of the casing to form with the outer end of the ring a smooth bearing surface to engage the flanged ends $c'$ of the elastic sack $C'$, which is made in the form of a glove finger, preferably of soft rubber.

These edges of the sack are pressed on firmly by the annular shoulders $t$ of the housing T and thus form an air-tight joint at the end of the pressure chamber $A^o$. $D'$ represents a hollow cylinder, shown as provided with two ribs $d$ and $d'$, which ribs slide freely in the cylindrical portions $T'$ and $T^2$ of the housing T. The spring K projects into the hollow cylinder $D'$ and its outer end surrounds the stem $V'$ of the screw plug V. By screwing in or out on this plug, the compression of the spring K may be varied within limits, and thus the adjustment of the measuring parts of the apparatus may be facilitated.

Mounted in the housing T is a sector W pivoted as at $w$ and having an arm $w'$ engaging the rib $d'$ on the outer end of the hollow piston $D'$. This sector W is provided with a segmental rack $w^2$ engaging the pinion X on the shaft $X'$, which carries the pointer or needle $X^2$ moving over a dial, not shown. Y represents a coil spring, which is so connected to the shaft $X'$, as to restore the pointer or needle to the initial or zero position, as shown in Fig. 2, but will permit the needle to be swung over the dial as the piston $D'$ is pressed outwards under the action of pneumatic pressure. It will be noted that this piston will press the sector W in one direction only, and hence will move the needle over the dial in one direction only and thus it will measure only the maximum pressure, which is admited to the pressure chamber $A^o$. For convenience in reading this pressure, I provide a brake arrangement, which consists of a bent spring Z fastened at one end in the housing as at $Z'$ and having its other end bent as at $Z^2$, to engage the push button $Z^3$. This spring normally bears on a friction disc $w^3$ carried by the shaft $w$ and the pressure of the spring on this friction disc is sufficient only to hold the needle against the return movement of the spring Y, but will permit the needle to be moved freely under the action of the piston, incident to the outward movement of the piston $D'$. Thus, when the needle is moved outward to indicate the pressure of the pressure chamber $A^o$, this spring Z will hold the needle steady, so it may be conveniently read.

Now, if the push button $Z^3$ be pressed on, this will release the spring Z from engagement with the friction disc $w^3$, and there being nothing to hold the needle, it will be returned to the initial or zero position under the action of the coil spring Y.

Obviously, the tension of this coil spring Y may be adjusted in any convenient way, as may also the compression of the spring K.

Thus, it will be seen that, the admission of the fluid under pressure to the pressure chamber will cause the piston to move outward and its motion will be transmitted to a needle passing over a dial.

To facilitate reading the dial, I provide a brake, which will hold the needle to indicate the maximum movement of the cylinder and yet which will permit the needle to be released and returned automatically to the initial position.

Thus, it will be seen that I provide a simple and efficient device, which is not likely to get out of order in normal use and which will register accurately the pressure indicated and yet which may be conveniently adjusted, when desired.

Having thus described my invention, what I claim and desire to secure by Letters Patent of the United States is:

1. A pressure gauge comprising a pressure chamber provided with an air duct opening into said chamber, a piston slidable freely in said chamber, a soft rubber sack loosely fitting said piston, and having its outer edges secured to said chamber, the said sack forming a flexible air tight closure for the open end of said chamber, a balance spring opposing the outward movement of said piston against the pressure of said chamber, said spring having one end bearing on said piston, and the other end bearing on said casing, means for adjusting the compression of said spring, a shaft journalled in said casing with its axis at right angles to the axis of said piston, an indicator needle mounted on said shaft, a coil spring engaging said shaft and normally returning said needle to the zero position, and means controlled by said piston for rotating said shaft against the action of said coil spring, with a spring brake normally holding said shaft against rotation by said coil spring, and means for releasing said brake, when desired.

2. A pressure gauge comprising a pressure chamber provided with an air duct opening into said chamber, a piston slidable freely in said chamber, a soft rubber sack loosely fitting said piston, and having its outer edges secured to said chamber, the said sack forming a flexible air tight closure for the open end of said chamber, a balance spring opposing the outward movement of said piston against the pressure of said chamber, said spring having one end bearing on said piston, and the other end bearing on said casing, means for adjusting the compression of said spring, a shaft journalled in said casing with its axis at right angles to the axis of said piston, an indicator needle mounted on said shaft, a coil spring engaging said shaft and normally returning said needle to the zero position, and means controlled by said piston for rotating said shaft against the action of said coil spring, with a spring brake normally holding said shaft against rotation by said coil spring, and a push button for releasing said brake, when desired.

ANDRÉ JULES MICHELIN.